United States Patent
Codrescu et al.

(10) Patent No.: US 7,523,295 B2
(45) Date of Patent: Apr. 21, 2009

(54) PROCESSOR AND METHOD OF GROUPING AND EXECUTING DEPENDENT INSTRUCTIONS IN A PACKET

(75) Inventors: Lucian Codrescu, Austin, TX (US); Erich Plondke, Austin, TX (US); Muhammad Ahmed, Austin, TX (US); Sujat Jamil, Austin, TX (US); William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 11/086,475

(22) Filed: Mar. 21, 2005

(65) Prior Publication Data

US 2006/0212681 A1 Sep. 21, 2006

(51) Int. Cl.
*G06F 9/30* (2006.01)
*G06F 9/40* (2006.01)

(52) U.S. Cl. .................. 712/214; 712/216; 712/218
(58) Field of Classification Search ................. 712/214, 712/218, 216, 220
See application file for complete search history.

(56) References Cited

U.S. PATENT DOCUMENTS

| | | | | |
|---|---|---|---|---|
| 5,404,469 A | * | 4/1995 | Chung et al. | 712/215 |
| 5,488,729 A | * | 1/1996 | Vegesna et al. | 712/209 |
| 5,500,942 A | * | 3/1996 | Eickemeyer et al. | 712/210 |
| 6,237,077 B1 | * | 5/2001 | Sharangpani et al. | 712/24 |
| 6,317,820 B1 | * | 11/2001 | Shiell et al. | 712/32 |
| 6,343,348 B1 | * | 1/2002 | Tremblay et al. | 711/149 |
| 6,401,190 B1 | * | 6/2002 | Nishioka et al. | 712/24 |
| 6,407,740 B1 | * | 6/2002 | Chan | 345/503 |
| 6,618,801 B1 | * | 9/2003 | Knebel et al. | 712/215 |
| 6,658,551 B1 | * | 12/2003 | Berenbaum et al. | 712/24 |
| 6,721,875 B1 | * | 4/2004 | McCormick et al. | 712/233 |
| 6,834,336 B2 | * | 12/2004 | Takayama et al. | 712/24 |
| 2002/0069345 A1 | * | 6/2002 | Mohamed et al. | 712/215 |
| 2002/0169942 A1 | | 11/2002 | Sugimoto | |
| 2003/0046429 A1 | * | 3/2003 | Sonksen | 709/246 |
| 2003/0154469 A1 | * | 8/2003 | Anderson et al. | 717/161 |
| 2006/0174089 A1 | * | 8/2006 | Altman et al. | 712/24 |

OTHER PUBLICATIONS

Theo Ungerer; Borut Robic; and Jurij Silc "Multithreaded Processors", The computer Journal, vol. 45, No. 3, 2002.*

* cited by examiner

*Primary Examiner*—Eddie P Chan
*Assistant Examiner*—Idriss N Alrobaye
(74) *Attorney, Agent, or Firm*—Nicholas J. Pauley; Sam Talpalatsky; Joseph B. Agusta

(57) ABSTRACT

An interleaved multithreading pipeline operating method comprises reading an instruction packet containing at least two instructions, steering a first instruction of the instruction packet to a first execution unit for execution and generating a first result, steering a second instruction of the instruction packet to a second execution unit for execution using the first result and generating a second result, and storing the second result.

22 Claims, 2 Drawing Sheets

PROCESSOR AND METHOD OF GROUPING AND EXECUTING DEPENDENT INSTRUCTIONS IN A PACKET

BACKGROUND

I. Field of the Invention

The present invention pertains generally to processors, and more specifically to a processor and method of grouping and executing dependent instructions in a packet.

II. Background

Digital signal processors are specialized processors that are capable of executing mathematical operations with speed. Digital signal processors (DSPs) may be used in image processing, audio processing, video processing, and many other applications. Digital signal processors are commonly embedded in a variety of devices such as mobile telephones, personal digital assistants, cameras, video cameras, and portable computing systems. To increase execution speed, some digital signal processors have an interleaved multithreading architecture to support concurrent execution of multiple hardware threads. Instructions from multiple threads are interleaved in the execution pipeline. This architecture enables the use of aggressive clock frequency while maintaining high core and memory utilization.

SUMMARY

Due to the interleaved multithreading architecture of an embodiment of a digital signal processor, the execution of each thread has sufficient time to permit instructions that are dependent on one another to be grouped in the same instruction packet. Therefore, an instruction that requires another instruction to be executed to generate its result and uses it in its own execution may be packaged into the same instruction packet as the other instruction. It may be seen that by giving program code writers the ability to have inter-dependencies among instructions in an instruction packet, more flexibility to manipulate program logic becomes possible.

In one aspect of an embodiment of the present disclosure, an interleaved multithreading pipeline operating method comprises reading an instruction packet containing at least two instructions, steering a first instruction of the first instruction packet to a first execution unit for execution and generating a first result, steering a second instruction of the instruction packet to a second execution unit for execution using the first result and generating a second result, and storing the second result.

In another aspect of an embodiment of the present disclosure, in an interleaved multithreading digital signal processor executing a plurality of interleaved threads substantially simultaneously, a method comprises reading an instruction packet containing at least two instructions, steering a first instruction of the instruction packet to a first execution unit, reading a first register specified by the first instruction and obtaining an operand, executing the first instruction and generating a first result, storing the first result in a second register, steering a second instruction of the instruction packet to a second execution unit, reading the second register specified by the second instruction, executing the second instruction using the first result read from the second register as an operand and generating a second result, and storing the second result in a third register.

In yet another aspect of an embodiment of the present disclosure, an interleaved multithreading digital signal processor executing a plurality of interleaved threads substantially simultaneously, the digital signal processor comprises means for reading an instruction packet containing at least two instructions, means for steering a first instruction of the instruction packet to a first execution unit, means for reading a first register specified by the first instruction and obtaining an operand, means for executing the first instruction and generating a first result, means for storing the first result in a second register, means for steering a second instruction of the instruction packet to a second execution unit, means for reading the second register specified by the second instruction, means for executing the second instruction using the first result read from the second register as an operand and generating a second result, and means for storing the second result in a third register.

In yet another aspect of an embodiment of the present disclosure, a computer-readable medium having encoded thereon a method for execution in an interleaved multithreaded processor, the method comprises reading an instruction packet containing at least two instructions, reading a first register specified by the first instruction and obtaining an operand, executing the first instruction and generating a first result, storing the first result in a second register, reading the second register specified by the second instruction, and executing the second instruction using the first result read from the second register as an operand and generating a second result.

In yet another aspect of an embodiment of the present disclosure, an interleaved multithreading digital signal processor executing a plurality of interleaved threads substantially simultaneously, the digital signal processor comprises an instruction cache operable to read an instruction packet containing at least two instructions, steering logic coupled to the instruction cache operable to steer a first instruction of the instruction packet to a first execution unit. The first execution unit is coupled to the steering logic and is operable to read a first register specified by the first instruction and obtaining an operand, execute the first instruction and generating a first result, store the first result in a second register. The steering logic is operable to steer a second instruction of the instruction packet to a second execution unit. The second execution unit is coupled to the steering logic and is operable to read the second register specified by the second instruction, execute the second instruction using the first result read from the second register as an operand and generating a second result, and store the second result in a third register.

BRIEF DESCRIPTION OF THE DRAWINGS

A more comprehensive understanding of this disclosure may be obtained by referencing the accompanying drawings when considered in conjunction with the subsequent detailed description.

DESCRIPTION OF SPECIFIC EMBODIMENTS

Figure 1:
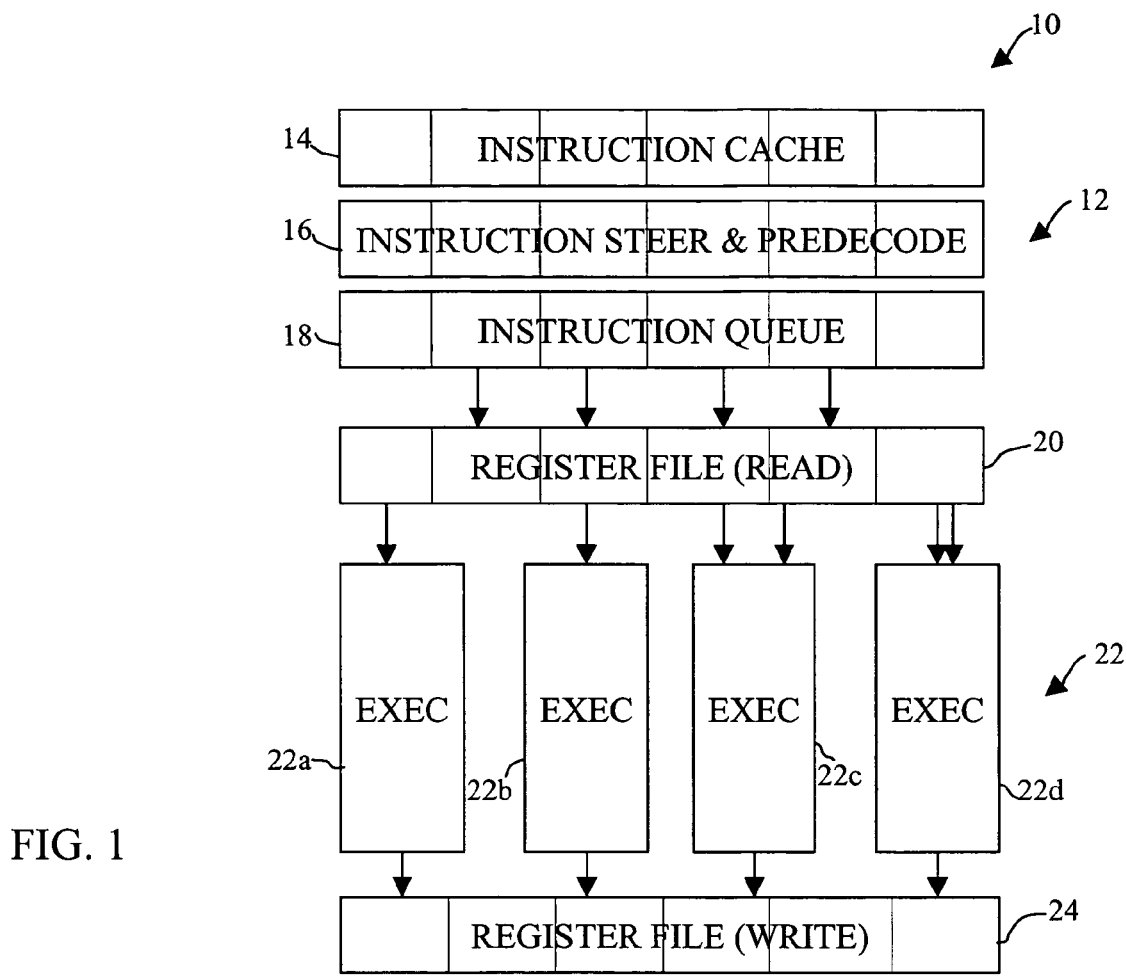
FIG. 1 is a simplified logical flow diagram of an embodiment of a processor pipeline.

FIG. 1 is a simplified logical flow diagram of an embodiment of a processor pipeline 10. The processor pipeline 10 may be implemented in a digital signal processor specialized in mathematical operations or in a general purpose processor. In one embodiment, the processor pipeline 10 has an interleaved multi-threading architecture that may execute six threads substantially simultaneously. The processor pipeline 10 comprises an instruction memory unit 12 comprising six threads. Program instructions are fetched from an instruction cache 14. An instruction steering and predecode logic 16 is then operable to resolve data dependencies and resource conflicts encoded in certain predetermined bits in the instructions and direct the instructions to specific execution units. The program instructions are then read into the instruction queue 18 pending execution. In an embodiment of the digital signal processor, each program instruction is an instruction packet that may contain from one to four separate instructions. Each instruction may comprise a source field that contains an index into a register file to read a value to be used by the execution of the instruction. A register file may be thought of as an array of registers accessible by an index into the register file. In an embodiment of the processor pipeline 10, the register file may have thirty-two registers, each register being thirty-two bits long, for example. A register file read operation 20 is then made to read the operands to execute the instruction for a thread. A plurality of execution units 22, such as four in this embodiment (execution units 22*a*-22*d*) are operable to carry out the execution of the program instructions in the instruction packet. An execution unit is capable of executing one instruction. A register file write operation 24 is then performed to save the execution results.

Figure 2:
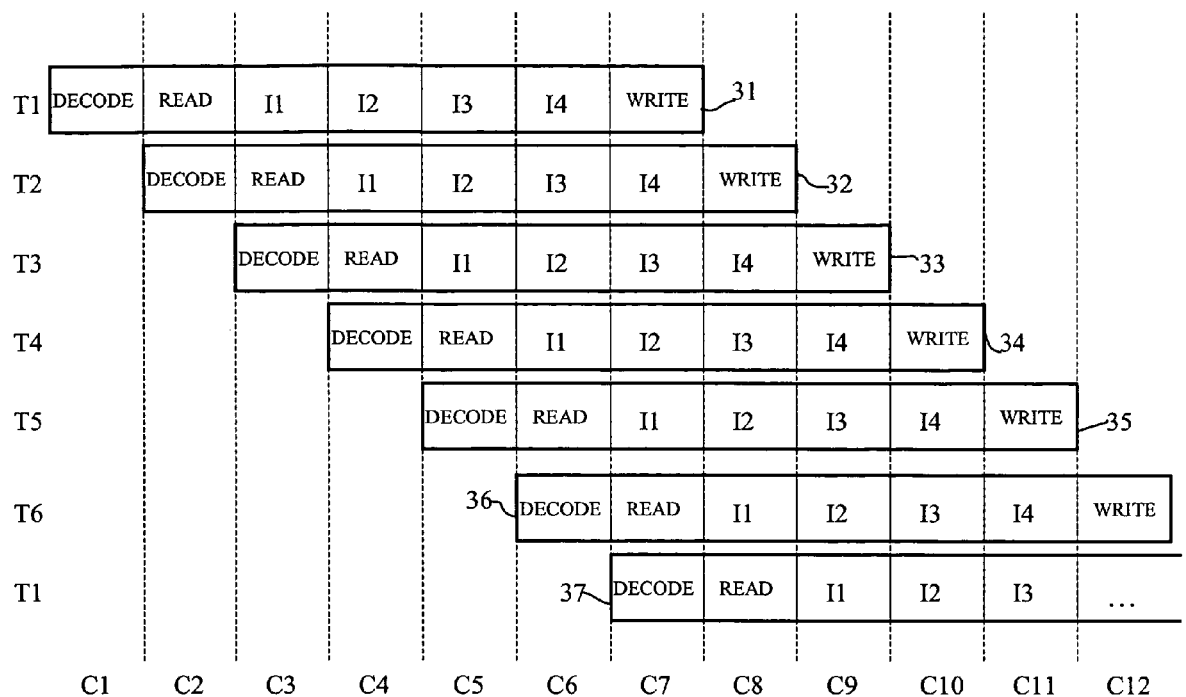
FIG. 2 is a simplified timing diagram of the interleaved multithreading execution of the processor pipeline.

FIG. 2 is a simplified timing diagram of the interleaved multithreading execution. The interleaved multithreading architecture of the processor pipeline 10 enables six instructions from six threads 31-36 (T1 to T6) to be substantially simultaneously executed. In the embodiment of the digital signal processor as shown, each program instruction is an instruction packet containing four separate instructions. Each instruction packet may be executed in seven clock cycles, for example, for decoding (clock cycle C1), reading the operands from the register file (clock cycle C2), executing the four instructions (clock cycles C3-C6), and finally writing the results to the register file (clock cycle C7). While an instruction packet from the first thread is being decoded and then the register file read for operands, the second instruction packet is being decoded. Operating in this manner, the start of the execution of each successive instruction packet lags behind the prior instruction packet by one clock cycle. Taking advantage of this execution characteristic of the processor pipeline, a previously unattainable operation is possible. Previously, it was not possible to group instructions that are dependent on one another's results in the same instruction packet, but because each thread is executed in seven clock cycles, with each instruction executing in successive clock cycles, it is possible for an instruction in a packet to use the results of another instruction in the same packet.

Figure 3:
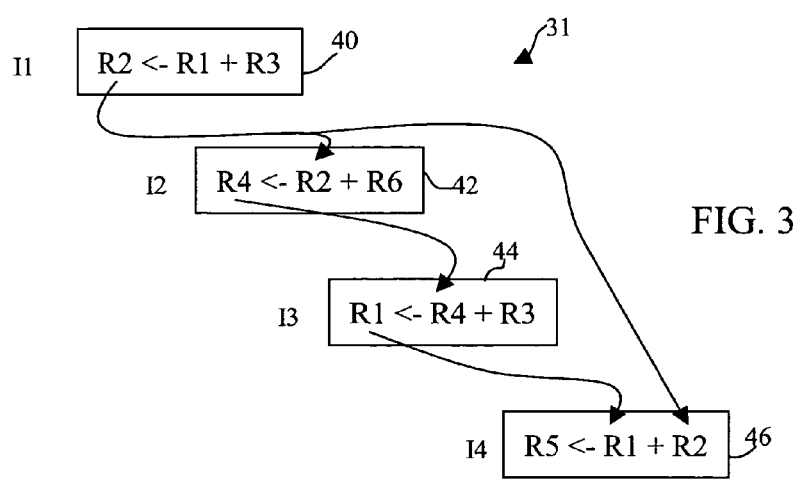
FIG. 3 is an exemplary logical flow diagram of multiple dependent instructions from the same instruction packet.

FIG. 3 is an exemplary logical flow diagram of multiple dependent instructions from the same instruction packet. This simple example is used solely to illustrate the inter-dependencies that may exist between instructions in the same instruction packet. An instruction 40 (I1) in the instruction packet 31 (FIG. 2) contains the mathematical operation R[2]=R[1]+R[3], for example, to add the contents of registers 1 to the contents of register 3 and to write the result to register 2. The contents of register 2 is then used as an operand in instruction 42 (I2) to perform the operation, R[4]=R[2]+R[6]. The contents of register 4 is then used as an operand in instruction 44 (I3) to perform R[1]=R[4]+R[3]. Thereafter, the contents of register 2 and register 1 are both used as operands in instruction 46 (I4) to perform R[5]=R[1]+R[2].

It should be noted that arithmetic instructions, scalar multiplication instructions, vector multiplication instructions, bit manipulation instructions, logical instructions, load instructions, store instructions, jump instructions, and other instructions may be grouped together in each instruction packet. The types of dependent instructions that can be grouped together into one instruction packet may be constrained by a number of factors such as resource availability. For example, if only execution units 22*c* and 22*d* are operable to perform scalar multiplication and vector multiplication instructions, then an instruction packet should only contain two such instructions. Further, such instructions should be ordered as 13 and 14 of the instruction packet and be steered to those execution units 22*c* and 22*d*.

Figure 4:
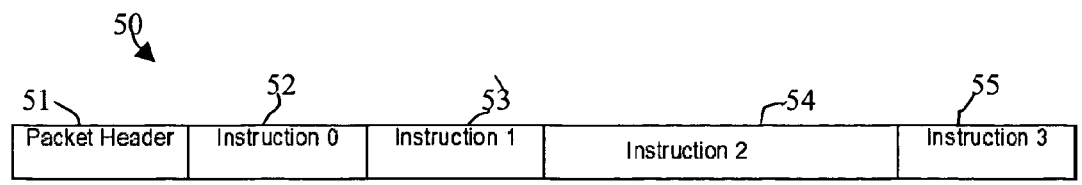
FIG. 4 is a diagram of an exemplary embodiment of an instruction packet format.

FIG. 4 is a diagram of an exemplary embodiment of an instruction packet format 50. Instruction packet 50 includes a packet header 51 followed by four instructions 52-55 grouped together in the packet. The packet header 51 may include one or more control fields used to indicate whether any of the group instructions is dependent on another instruction in the same instruction packet. For example, a particular bit may be used in the packet header 51 to indicate whether instruction #0 is dependent on, i.e. gets its source data from, instruction #1 or the register file. Other manner of implementation may be used to indicate inter-dependencies of instructions in the instruction packet.

It may be seen from the foregoing that by giving program code writers the ability to have inter-dependencies among instructions in an instruction packet, more flexibility to manipulate program logic becomes possible. The embodiments described herein may be implemented in hardware, software or a combination of hardware and software. The number of instructions that may be grouped into the same instruction packet is dependent on many design and implementation considerations, and the implementation of four grouped instructions and other details are provided herein only as an example and should not be construed to limit the scope of the claims.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. An interleaved multithreading pipeline operating method comprising:

reading a first instruction packet associated with a first thread, the first instruction packet containing an instruction packet header and at least two instructions, wherein the instruction packet header includes instruction dependency information indicating inter-dependencies of instructions in the first instruction packet;

determining from the instruction dependency information in the instruction packet header whether inter-dependencies exist between instructions in the first instruction packet;

performing a first operation of a second instruction packet associated with a second thread;

steering a first instruction of the first instruction packet to a first execution unit for execution and generating a first result;

steering, in response to determining that inter-dependencies exist between instructions in the first instruction packet, a second instruction of the first instruction packet to a second execution unit for execution using the first result and generating a second result, the second result generated after performing the first operation of the second instruction packet; and storing the second result;

wherein a start of execution of the first instruction packet occurs prior to a start of execution of the second instruction packet by one clock cycle.

2. The method of claim 1, further comprising:

steering a third instruction of the first instruction packet to a third execution unit for execution using at least one of the first and second results and generating a third result; and storing the third result.

3. The method of claim 2, further comprising:

steering a fourth instruction of the first instruction packet to a fourth execution unit for execution using at least one of the first, second and third results and generating a fourth result; and storing the fourth result.

4. The method of claim 1, further comprising:

reading a first register specified by the first instruction to obtain a first operand;

executing the first instruction on the first operand and generating the first result;

saving the first result in a second register specified by the first instruction;

reading the second register specified by the second instruction; and executing the second instruction using the first result read from the second register and generating the second result.

5. The method of claim 4, further comprising:

storing the second result in a third register specified by a third instruction of the first instruction packet; and executing the third instruction using the second result read from the third register and generating a third result.

6. The method of claim 5, further comprising:

storing the third result in a fourth register specified by a fourth instruction of the first instruction packet; and executing the fourth instruction using the third result read from the fourth register and generating a fourth result.

7. The method of claim 6, wherein executing the first, second, third and fourth instructions includes executing instructions selected from the group consisting of arithmetic instructions, scalar multiplication instructions, vector multiplication instructions, bit manipulation instructions, logical instructions, load instructions, store instructions, and jump instructions.

8. In an interleaved multithreading digital signal processor executing a plurality of interleaved threads substantially simultaneously, a method comprising:

reading a first instruction packet for a first thread, the first instruction packet containing an instruction packet header and at least two instructions, wherein the first instruction packet header includes information indicating inter-dependencies of instructions in the same instruction packet;

reading the instruction packet header;

determining, from the instruction packet header, inter-dependencies between instructions in the first instruction packet;

steering a first instruction of the first instruction packet to a first execution unit;

reading a first register specified by the first instruction and obtaining an operand;

executing the first instruction and generating a first result;

storing the first result in a second register;

steering, in response to determining that inter-dependencies exist, a second instruction of the first instruction packet to a second execution unit;

reading the second register specified by the second instruction;

executing the second instruction using the first result read from the second register as an operand and generating a second result; and storing the second result in a third register, wherein a start of execution of the first instruction packet of the first thread occurs prior to a start of execution of a second instruction packet of a second thread by one clock cycle.

9. The method of claim 8, wherein reading a first register specified by the first instruction comprises accessing a source field of the first instruction and reading the first register indexed by a value in the source field.

10. The method of claim 8, wherein storing the first result in a second register comprises accessing a destination field of the first instruction and storing the first result in the second register indexed by a value in the destination field.

11. The method of claim 8, wherein reading the second register specified by the second instruction comprises accessing a source field of the second instruction and reading the second register indexed by a value in the source field.

12. The method of claim 8, wherein storing the second result in a third register comprises accessing a destination field of the second instruction and storing the second result in the third register indexed by a value in the destination field.

13. An interleaved multithreading hardware digital signal processor executing a plurality of interleaved threads substantially simultaneously, the digital signal processor comprising:

means for reading an instruction packet containing an instruction packet header and at least two instructions, wherein the instruction packet header includes a control field having at least one bit to indicate when a first instruction of the at least two instructions receives source data from a second instruction in the same instruction packet;

means for reading the instruction packet header;

means for determining, from the instruction packet header, inter-dependencies between instructions in the instruction packet;

means for steering a first instruction of the instruction packet to a first execution unit;

means for reading a first register specified by the first instruction and obtaining an operand;

means for executing the first instruction and generating a first result;

means for storing the first result in a second register;

means for steering, in response to determining that inter-dependencies exist, a second instruction of the instruction packet to a second execution unit;

means for reading the second register specified by the second instruction;

means for executing the second instruction using the first result read from the second register as an operand and generating a second result; and means for storing the second result in a third register;

wherein a start of execution of the instruction packet occurs prior to a start of execution of a second instruction packet by one clock cycle.

14. A computer-readable medium having encoded thereon instructions for execution in an interleaved multithreaded processor, the instructions comprising:
- reading a first instruction packet for a first thread, the first instruction packet containing an instruction packet header and at least two instructions, wherein the instruction packet header includes information indicating inter-dependencies of instructions in the same instruction packet;
- reading the instruction packet header;
- determining from the instruction packet header inter-dependencies between instructions in the first instruction packet;
- steering a first instruction of the first instruction packet to a first execution unit;
- reading a first register specified by the first instruction and obtaining an operand;
- executing the first instruction at a first execution unit and generating a first result;
- storing the first result in a second register;
- steering, in response to determining that inter-dependencies exist, a second instruction of the first instruction packet to a second execution unit;
- reading the second register specified by the second instruction;
- executing the second instruction using the first result read from the second register as an operand, and generating a second result; and
- storing the second result in a third register, wherein a start of execution of the first instruction packet of the first thread occurs prior to a start of execution of a second instruction packet of a second thread by one clock cycle, and wherein the start of execution of the first instruction packet of the first thread occurs prior to a start of execution of a third instruction packet of a third thread by two clock cycles.

15. The method of claim 1, wherein the first instruction packet executes during seven consecutive clock cycles including a first clock cycle to decode instructions, a second clock cycle to read from the register file, a third clock cycle to execute the first instruction, a fourth clock cycle to execute the second instruction, a fifth clock cycle to execute a third instruction, a sixth clock cycle to execute a fourth instruction, and a seventh clock cycle to write to the register file, and wherein execution of the second instruction packet begins during the second clock cycle and ends during an eighth clock cycle.

16. The method of claim 1, wherein the first operation of the second instruction packet associated with the second thread is performed while reading a register file for operands corresponding to the first instruction packet.

17. The method of claim 8, wherein the start of execution of the first instruction packet occurs prior to the start of execution of the second instruction packet by one clock cycle.

18. The method of claim 8, wherein six threads are executed substantially simultaneously.

19. The method of claim 18, wherein each thread of the six threads is executed in seven clock cycles.

20. The method of claim 13, wherein the first instruction is selected from one of arithmetic instructions, scalar multiplication instructions, vector multiplication instructions, bit manipulation instructions, logical instructions, load instructions, store instructions, and jump instructions, and wherein the second instruction is selected from a different one of arithmetic instructions, scalar multiplication instructions, vector multiplication instructions, bit manipulation instructions, logical instructions, load instructions, store instructions, and jump instructions.

21. The method of claim 20, wherein the first instruction packet includes a number of instructions of a particular type, the number of instructions not exceeding a number of execution units operable to execute the instructions of the particular type.

22. The method of claim 21, wherein the interleaved multithreading digital signal processor has two execution units operable to execute multiplication instructions, wherein each instruction packet executed on each thread includes no more than two multiplication instructions, and wherein each multiplication instruction of each instruction packet is ordered to execute after other instructions of the instruction packet.

* * * * *

UNITED STATES PATENT AND TRADEMARK OFFICE
CERTIFICATE OF CORRECTION

PATENT NO.       : 7,523,295 B2                                                           Page 1 of 1
APPLICATION NO.  : 11/086475
DATED            : April 21, 2009
INVENTOR(S)      : Codrescu et al.

It is certified that error appears in the above-identified patent and that said Letters Patent is hereby corrected as shown below:

Column 6, line 21, claim 10: "a second register" to read as --the second register--

Column 6, line 29, claim 12: "a third register" to read as --the third register--

Column 7, line 18, claim 14: "a first execution" to read as --the first execution--

Signed and Sealed this
Thirty-first Day of May, 2011

David J. Kappos
*Director of the United States Patent and Trademark Office*